Figure 1:
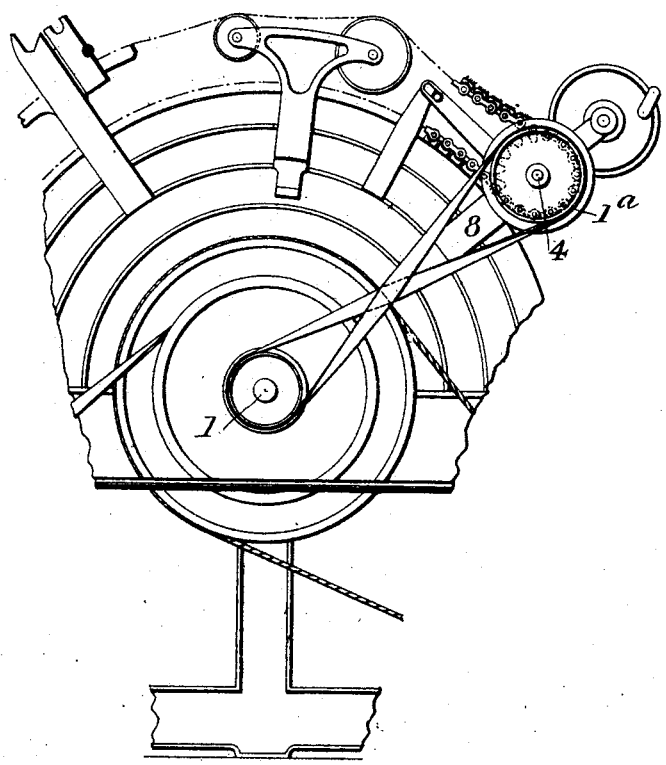

(No Model.) 2 Sheets—Sheet 1.

A. HITCHON.
APPARATUS FOR DRIVING THE FLATS OF TRAVELING FLAT
CARDING ENGINES.

No. 501,836. Patented July 18, 1893.

Witnesses. Inventor.

(No Model.) 2 Sheets—Sheet 2.
A. HITCHON.
APPARATUS FOR DRIVING THE FLATS OF TRAVELING FLAT CARDING ENGINES.
No. 501,836. Patented July 18, 1893.
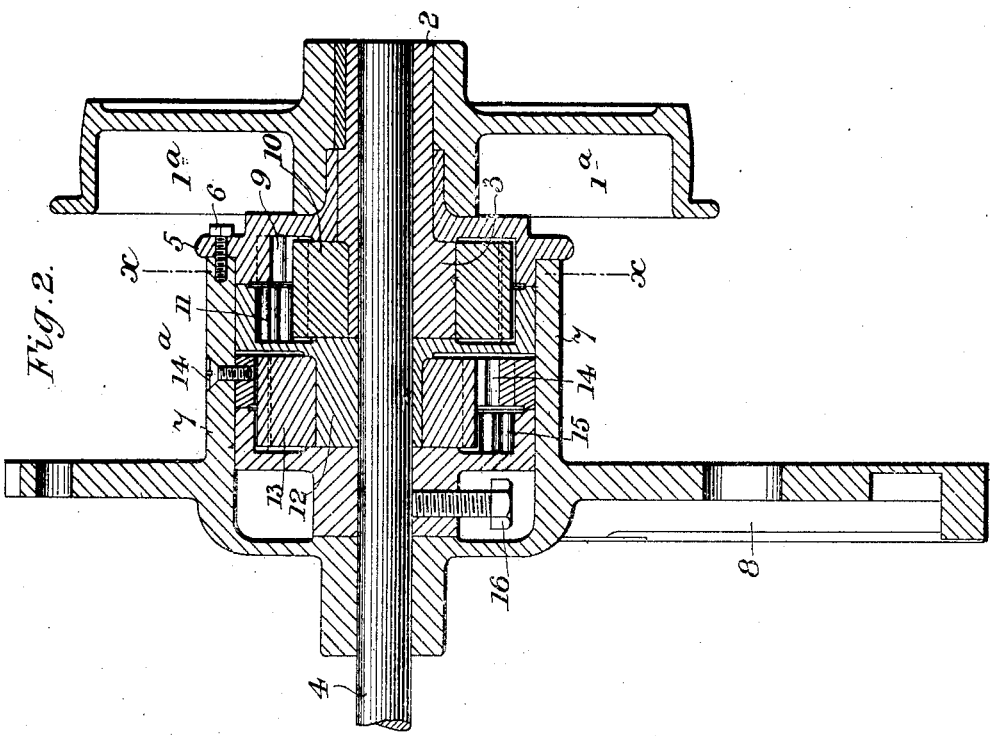
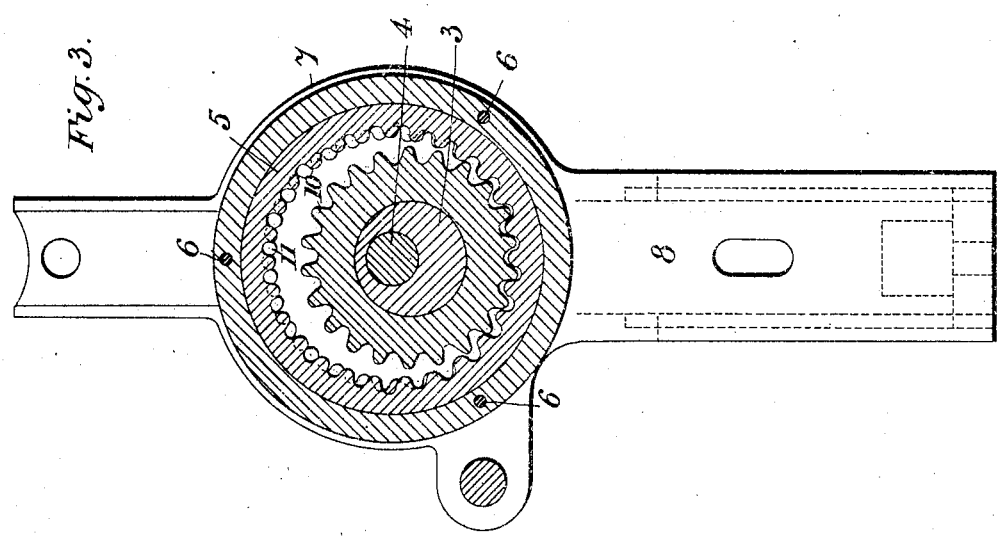
Witnesses.
Tom Ballough
E. W. Horn
Inventor.
Alfred Hitchon

UNITED STATES PATENT OFFICE.

ALFRED HITCHON, OF ACCRINGTON, ENGLAND.

APPARATUS FOR DRIVING THE FLATS OF TRAVELING-FLAT CARDING-ENGINES.

SPECIFICATION forming part of Letters Patent No. 501,836, dated July 18, 1893.

Application filed March 6, 1893. Serial No. 464,861. (No model.)

*To all whom it may concern:*

Be it known that I, ALFRED HITCHON, a subject of Her Majesty the Queen of Great Britain, residing at Accrington, in the county of Lancaster, England, have invented a certain new and useful Improvement in Apparatus for Driving the Flats of Traveling-Flat Carding-Engines, of which the following is a specification.

This invention relates to apparatus or gearing for driving the revolving flats of carding engines more particularly at the parts where the driving mechanism is between the quick running main cylinder shaft and the driven star wheels which give the slow traveling motion to the flats working over the card cylinder surface. The slow traveling of the flats is usually accomplished by means of an arrangement of worm gearing and wheels, but by this method there is a considerable loss of power by friction between the worm and worm wheel teeth, and careful attention is required in the lubrication of same to mitigate the rapid wearing which otherwise takes place.

According to my invention I make use of a combination of spur gearing operated by eccentrics and planet wheels, as illustrated in the accompanying drawings in which—

Figure 1 is a side elevation of a part of a traveling flat carding engine having my improved slow driving apparatus applied thereto. Fig. 2 is a side sectional elevation on an enlarged scale of my improved apparatus or gearing and Fig. 3 is a cross section on the line $x$—$x$ of Fig. 2.

At 1 is the main cylinder shaft which drives the pulley $1^a$ by means of a suitable strap or belt as shown in Fig. 1. This pulley is keyed on the bush 2 which has an eccentric 3 formed at its inner end, the bush 2 and its eccentric 3 being loosely mounted on the shaft 4 which drives the star wheel for operating the flats.

5 is a stationary ring fixed by set screws 6 to the circular shell bearing 7 which may also form a bearing for the shaft to be driven by this mechanism, the circular shell 7 being fixed by a bracket 8, to the side of the carding engine (see Fig. 1). The interior of the stationary ring 5 has teeth formed in it and this constitutes the circular rack 9 (having say twenty-seven teeth.) On the eccentric bush 3 is mounted a broad planet wheel 10, having say twenty-two teeth, which engage partly with the teeth in the stationary internal rack 9 and partly with the teeth of an internally toothed revolving wheel 11 (with say twenty-six teeth) to which is cast the second eccentric boss 12 and mounted on this boss 12 is the broad planet wheel 13 which gears partly with the second stationary internally toothed circular rack 14 (of twenty-seven teeth) said rack being fixed by set screws $14^a$ to the circular shell 7. The broad planet wheel 13 also engages partly with the internal (say twenty-six toothed) revolving wheel 15 which is secured by screw 16 onto the flat driving shaft 4.

Each of the broad planet wheels 10, 13 is preferably made in two parts which are secured together as one wheel in order to obtain greater accuracy.

The operation is as follows:—The pulley $1^a$ turns the first driving eccentric 3 and also the broad planet wheel 10 one side or edge of this wheel gearing into the circular stationary rack 9 the other side or edge gearing with the internal toothed wheel 11. The planet wheel 13 on the eccentric boss 12 of the wheel 11 gears partly with the fixed circular rack 14 and partly with the internally toothed wheel 15 fast on the shaft 4 so that the speed of the latter will be in ratio to the speed of the pulley $1^a$ in proportion to the difference in the number of teeth in the racks and wheels thus reducing the speed so that six hundred and seventy-six revolutions of the pulley $1^a$ will cause the flat driving shaft 4 to make only one revolution.

By the use of the above described apparatus the carding engine is rendered more compact, less complicated in its parts, and more effective than heretofore.

In place of the fixed or movable racks having the differing number of teeth as shown the planet wheel may vary in its number of teeth and be in the form of a double wheel one to gear with the fixed rack and one to gear with the movable one.

What I claim is—

1. In an apparatus for driving the flats of carding engines, the combination with the flat driving shaft, of a driven boss on the said shaft having an eccentric thereon, a planet wheel mounted on the said eccentric, an internally toothed wheel journaled on the said shaft, a fixed internally toothed ring, a second eccentric attached to the said toothed wheel, a second stationary internally toothed ring, an internally toothed wheel secured on the said shaft and a second planet wheel mounted on the second eccentric and gearing with the second stationary ring and the wheel secured upon the shaft, substantially as described.

2. In combination, the main shaft, the flat driving shaft, a boss on the flat driving shaft, a pulley and an eccentric carried thereby, a planet wheel on the eccentric, a stationary rack, and a loose rack, having a different number of teeth, with which the planet wheel engages, a second eccentric attached to the loose rack, a second planet wheel mounted on said eccentric, a second fixed rack, a second driven rack, having a different number of teeth, with which the planet wheel engages, such driven rack being secured to the flat driving shaft, and a casing to which the stationary racks are secured, substantially as described.

In testimony whereof I have hereunto set my hand in the presence of two subscribing witnesses.

ALFRED HITCHON.

Witnesses:
TOM BULLOGH,
E. W. HORNE,
*Accrington.*